US012445080B2

(12) United States Patent
Chung et al.

(10) Patent No.: US 12,445,080 B2
(45) Date of Patent: Oct. 14, 2025

(54) NON-ROTATING LOCATION IDENTIFICATION IN POWER TOOLS

(71) Applicant: MILWAUKEE ELECTRIC TOOL CORPORATION, Brookfield, WI (US)

(72) Inventors: Shi-Uk Chung, Brookfield, WI (US); Matthew R. Bailey, Racine, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 153 days.

(21) Appl. No.: 18/318,349

(22) Filed: May 16, 2023

(65) Prior Publication Data

US 2023/0370011 A1 Nov. 16, 2023

Related U.S. Application Data

(60) Provisional application No. 63/342,286, filed on May 16, 2022.

(51) Int. Cl.
*H02P 1/00* (2006.01)
*H02P 29/00* (2016.01)

(52) U.S. Cl.
CPC .................................. *H02P 29/00* (2013.01)

(58) Field of Classification Search
CPC .......... H02P 6/183; H02P 29/00; H02P 21/22; H02P 27/06; H02P 21/34
See application file for complete search history.

(56) References Cited

U.S. PATENT DOCUMENTS

2018/0331768 A1 11/2018 Szell
2022/0241951 A1* 8/2022 Obermann ............... H02P 6/182

\* cited by examiner

*Primary Examiner* — Karen Masih
(74) *Attorney, Agent, or Firm* — Michael Best & Friedrich LLP (57) ABSTRACT

A power tool including a battery pack interface configured to receive a removable and rechargeable battery pack, a motor including a rotor and a stator, the rotor operable to rotate relative to the stator, and a switching module that includes a plurality of switching devices connected between the battery pack interface and the motor. The power tool further includes a controller including a processor and a memory. The controller is configured to receive a signal from an external device, control the switching module to provide a high frequency current signal from battery pack to the motor in response to receiving the signal, the motor configured to emit an audible sound in response to the high frequency current signal, and control the switching module to stop providing the high frequency current signal to the motor.

20 Claims, 10 Drawing Sheets

NON-ROTATING LOCATION IDENTIFICATION IN POWER TOOLS

RELATED APPLICATIONS

This application claims the benefit of U.S. Provisional Patent Application No. 63/342,286, filed May 16, 2022, the entire content of which is hereby incorporated by reference.

FIELD

Embodiments described herein provide location identification features in power tools.

SUMMARY

Power tools described herein include an interface configured to receive a removable and rechargeable battery pack, a motor including a rotor and a stator, the rotor being operable to rotate relative to the stator, and a switching module that includes a plurality of switching devices connected between the battery pack interface and the motor. The power tool further includes a controller including a processor and a memory. The controller is configured to receive a signal from an external device, and control the switching module to provide a high frequency current signal from battery pack to the motor in response to receiving the signal. The motor emits an audible sound in response to the high frequency current signal. The controller is then configured to control the switching module to stop providing the high frequency current signal to the motor.

Methods for locating power tools described herein include receiving, by a controller of the power tool, a signal from an external device and controlling, by the controller, a switching module to provide a high frequency current signal from a battery pack to a motor included in the power tool in response to receiving the signal. The methods further include emitting, by the motor, an audible sound in response to the high frequency current signal and controlling, by the controller, the switching module to stop providing the high frequency current signal to the motor.

Communication systems described herein include an external device including a wireless communication controller configured to transmit a signal and a power tool. The power tool includes an interface configured to receive a removable and rechargeable battery pack, a motor including a rotor and a stator, the rotor being operable to rotate relative to the stator, a switching module that includes a plurality of switching devices connected between the battery pack interface and the motor, and a wireless communication controller configured to wirelessly receive the signal transmitted by the external device. The power tool further includes a controller including a processor and a memory. The controller is configured to control the switching module to provide a high frequency current signal from battery pack interface to the motor in response to the wireless communication controller receiving the signal. The motor is configured to emit an audible sound in response to the high frequency current signal.

Before any embodiments are explained in detail, it is to be understood that the embodiments are not limited in application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

DETAILED DESCRIPTION

Figure 1:
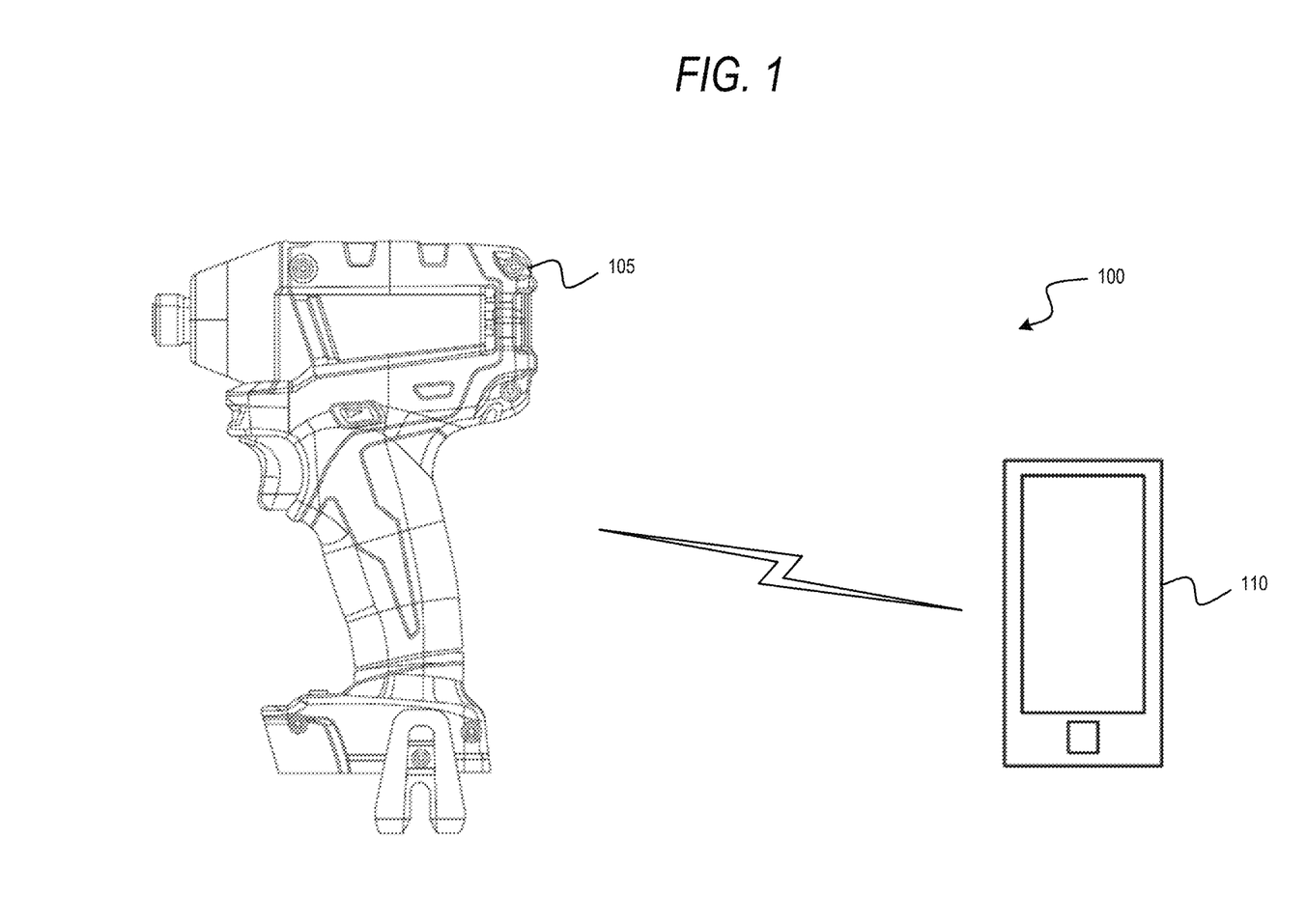
FIG. 1 illustrates a communication system, according to embodiments described herein.

FIG. 1 illustrates a communication system 100 that includes a power tool 105 and an external device 110. The power tool 105 is configured to communicate wirelessly with the external device 110 while the power tool 105 is within communication range of the external device 110. In some embodiments, the power tool 105 wirelessly transmits signals that indicate one or more of a power tool status, power tool operation statistics, power tool identification, stored power tool usage information, power tool maintenance data, and/or other data associated with the power tool 105 to the external device 110. In some embodiments, the external device 110 is configured to wirelessly transmit signals that are used to control operation of power tool 105. For example, the external device 110 may be configured to transmit signals that command power tool 105 to perform an operation (e.g., emit a sound, illuminate an indicator, etc.), configure one or more parameters of the power tool 105, update firmware of the power tool 105, and/or remotely control some other feature of the power tool 105. Although illustrated as including a single power tool 105 and a single external device 110, it should be understood that in some embodiments, the communication system 100 includes a plurality of power tools and/or a plurality of external devices.

Figure 2:
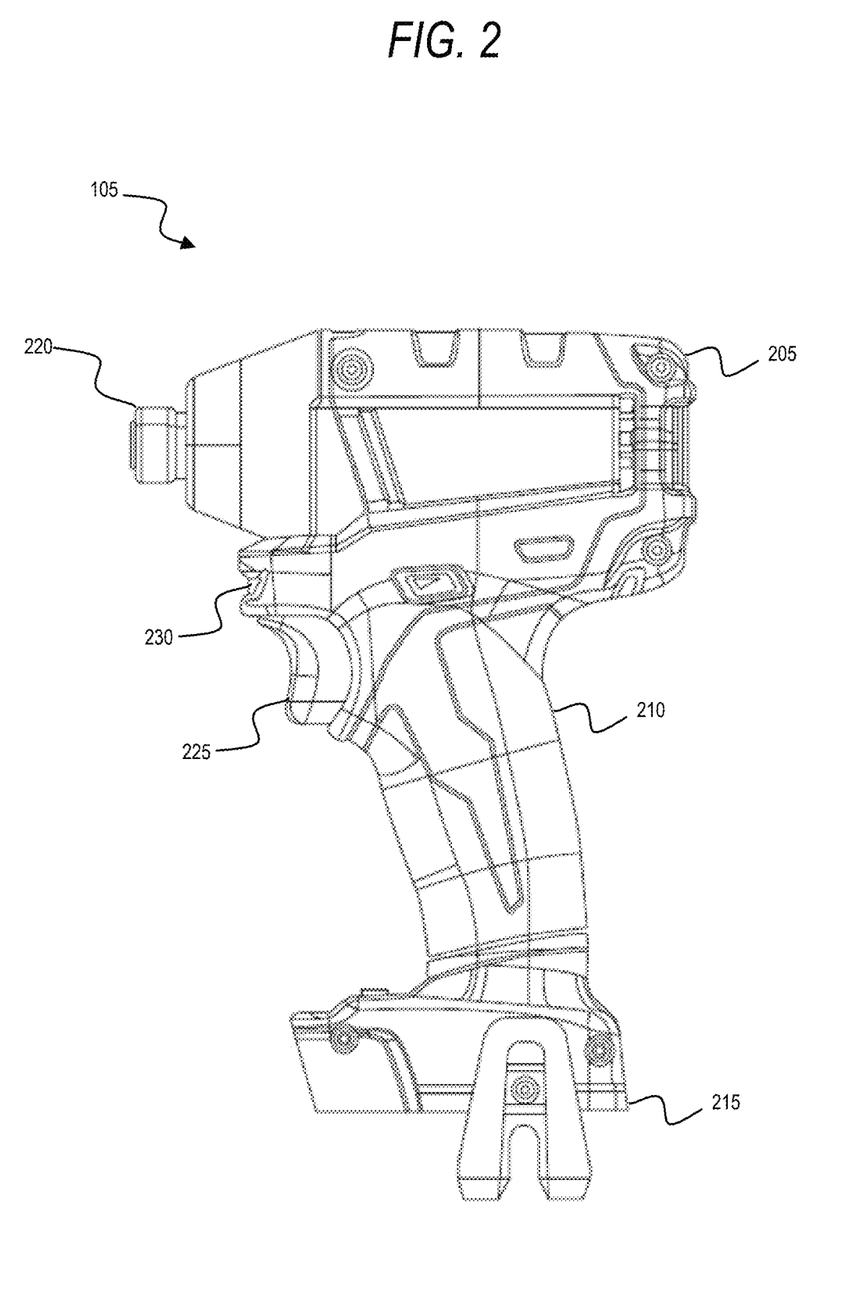
FIG. 2 illustrates a power tool included in the communication system of FIG. 1, according to embodiments described herein.

FIG. 2 illustrates a side view of the power tool 105. Although illustrated as a battery pack powered impact driver, it should be understood that the power tool 105 may be implemented as any type of power tool that includes a motor (e.g., a power drill, a hammer drill, a pipe cutter, a sander, a nailer, a grease gun, etc.). That is, the illustrated impact driver is merely representative and power tool 105 is not limited in implementation to an impact driver. Moreover, any description of power tool 105 with respect to the figures is similarly applicable to other types of power tools used to implement power tool 105.

As shown in FIG. 2, the power tool 105 includes an upper main body 205, a handle 210, a battery pack receiving portion 215, an output drive device or mechanism 220, a trigger 225, and one or more indicators 230 (e.g., a worklight). The drive device 220 is illustrated as a socket. However, it should be understood that other types of power tools may include other types of drive devices. For example, the drive device for a power drill may include a bit driver, while the drive device for a pipe cutter may include a blade. The battery pack receiving portion 215 is configured to receive and couple to a removeable and rechargeable battery pack 235 (see FIG. 3) that provides power to the power tool 105. The battery pack receiving portion 215 includes a connecting structure to engage a mechanism that secures the battery pack 235 and an interface to electrically connect the battery pack 235 to the power tool 105. In some embodiments, power tool 105 is powered by an AC power source and does not include a battery pack receiving portion.

Figure 3:
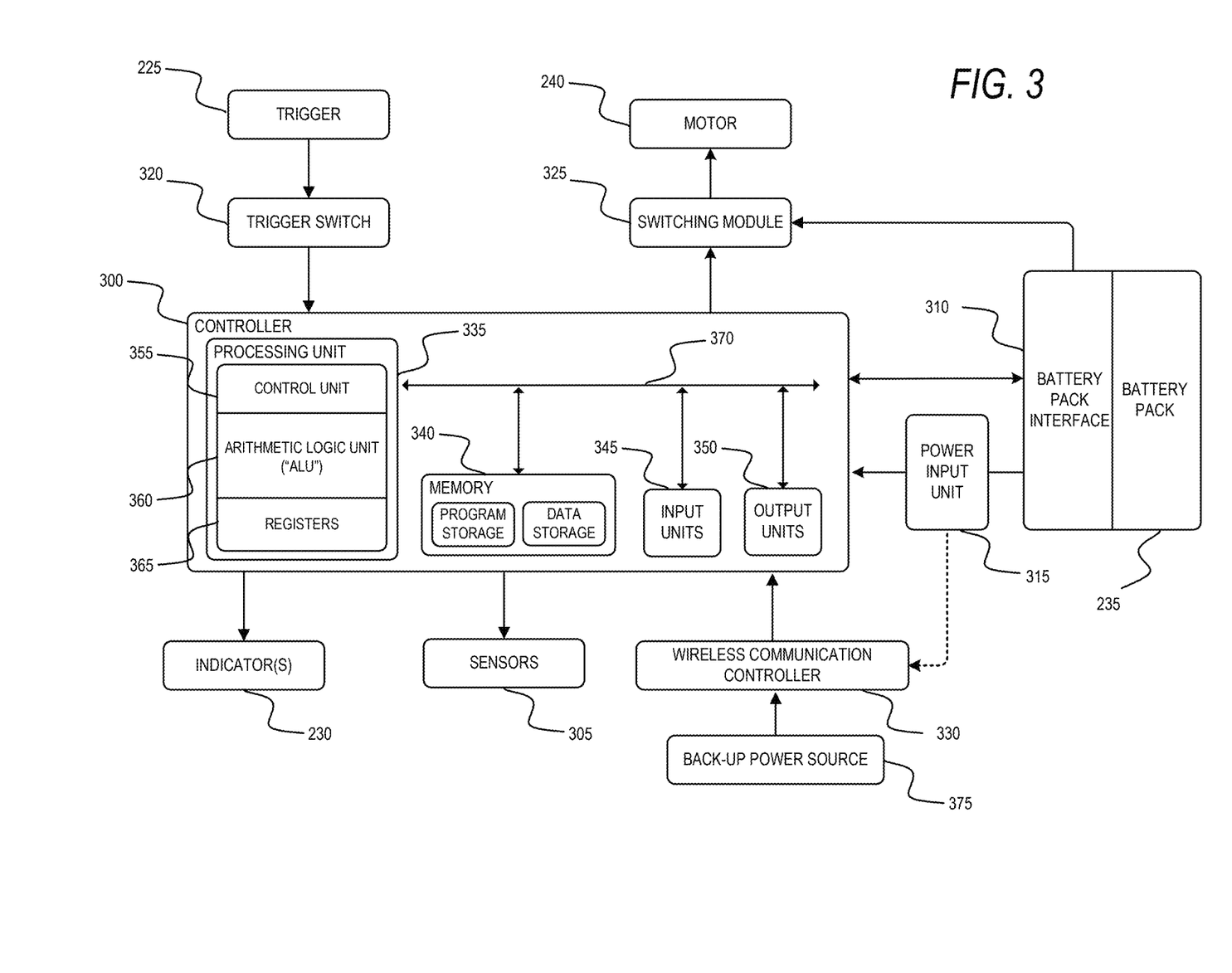
FIG. 3 illustrates a block diagram of a controller included in the power tool of FIG. 2, according to embodiments described herein.
Figure 4:
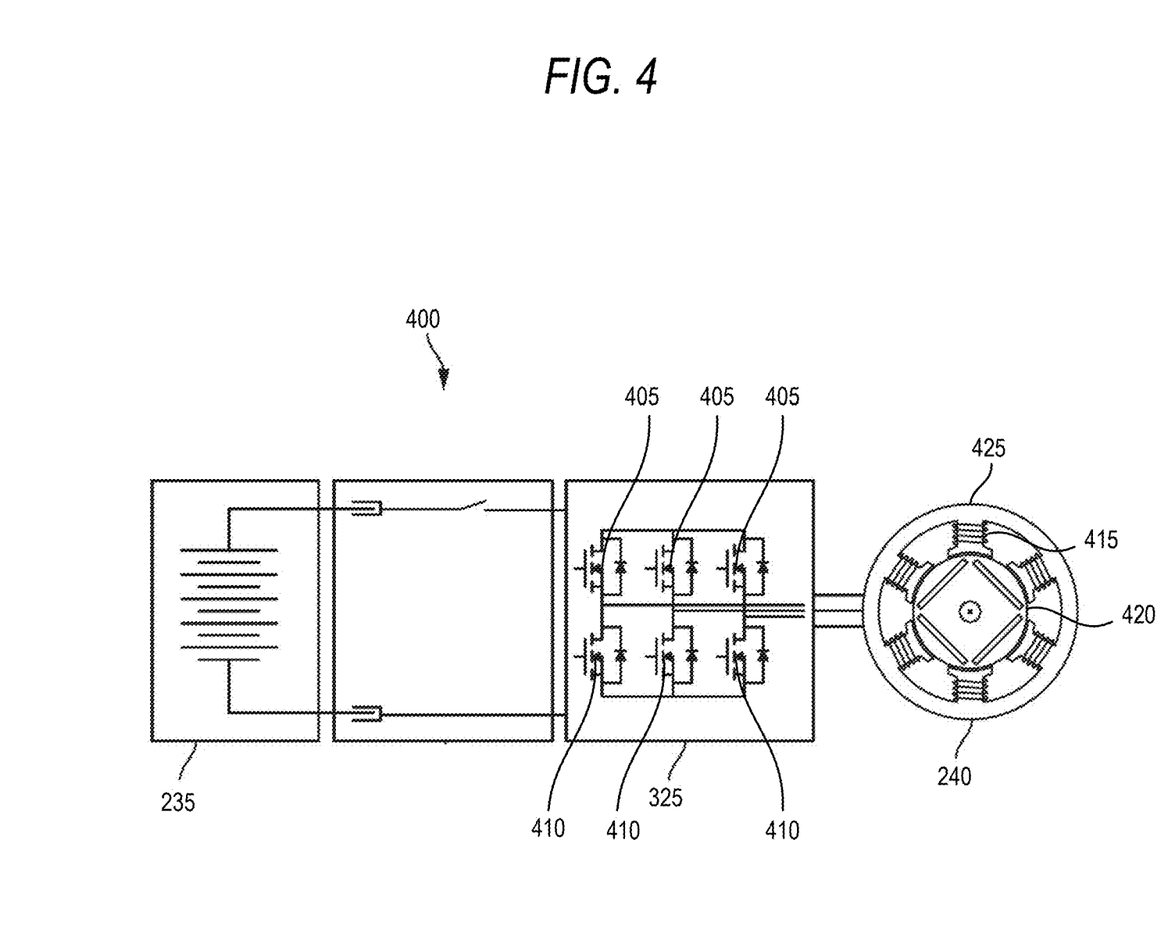
FIG. 4 illustrates a circuit diagram for a switching module, according to embodiments described herein.

As shown in FIGS. 3 and 4, the power tool 105 further includes a motor 240. The motor 240 actuates the drive device 220 and allows the drive device 220 to perform a particular operating task (e.g., tightening). In operation, the motor 240 is energized based on the position of the trigger 225. For example, when the trigger 225 is depressed the motor 240 is energized. Likewise, when the trigger 225 is released, the motor 240 is de-energized. As will be described in more detail below, the motor 240 may also be energized in response to a command received from the external device 110 (e.g., without the trigger 225 being actuated).

FIG. 3 is a generalized schematic of the controller 300 included in the power tool 105. The controller 300 is electrically and/or communicatively connected to a variety of modules or components of the power tool 105. For example, the controller 300 may be connected to the one or more indicators 230, one or more sensors 305, a battery pack interface 310, a power input unit 315, a trigger switch 320, a switching module 325, and a wireless communication controller 330.

The controller 300 includes a plurality of electrical and electronic components that provide power, operational control, and protection to the components and modules within the controller 300 and/or power tool 105. For example, the controller 300 includes, among other things, a processing unit, or processor, 335 (e.g., a microprocessor, an electronic processor, an electronic controller, a microcontroller, or another suitable programmable device), a memory 340, input units 345, and output units 350. The processing unit 335 includes, among other things, a control unit 355, an arithmetic logic unit ("ALU") 360, and a plurality of registers 365 (shown as a group of registers in FIG. 3), and is implemented using a known computer architecture (e.g., a modified Harvard architecture, a von Neumann architecture, etc.). The processing unit 335, the memory 340, the input units 345, and the output units 350, as well as the various modules connected to the controller 300 are connected by one or more control and/or data buses (e.g., common bus 370). The control and/or data buses are shown generally in FIG. 3 for illustrative purposes. The use of one or more control and/or data buses for the interconnection between and communication among the various modules and components would be known to a person skilled in the art in view of the embodiments described herein.

The memory 340 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 335 is connected to the memory 340 and executes software instructions that are capable of being stored in a RAM of the memory 340 (e.g., during execution), a ROM of the memory 340 (e.g., on a generally permanent basis), or another non-transitory computer readable medium such as another memory or a disc. Software included in the implementation of the power tool 105 can be stored in the memory 340 of the controller 300. The software includes, for example, firmware, one or more applications, program data, filters, rules, one or more program modules, and other executable instructions. The controller 300 is configured to retrieve from the memory 340 and execute, among other things, instructions related to the control processes and methods described herein. In other embodiments, the controller 300 includes additional, fewer, or different components.

The controller 300 is configured to activate the one or more indicators 230 to illuminate a workpiece and/or otherwise convey information about power tool 105 to a user. The indicators 230 include, for example, one or more light emitting diodes (LEDs), a display screen, etc. In addition to or in place of visual indicators, the indicators 230 may also include a speaker or a tactile feedback mechanism to convey information to a user through audible or tactile outputs. The sensors 305 are coupled to the controller 300 and communicate to the controller 300 various signals indicative of one or more conditions of the power tool 105 and/or the motor 240. The sensors 305 may include one or more Hall effect sensors, current sensors, voltage sensors, temperature sensors, torque sensors, and/or other types of sensors.

The battery pack interface 310 is positioned within the battery pack receiving portion 215 and includes a combination of mechanical and electrical components configured to and operable for interfacing (e.g., mechanically, electrically, and communicatively connecting) the power tool 105 with the battery pack 235. The battery pack interface 310 transmits the power received from the battery pack 235 to the power input unit 315. The power input unit 315 includes active and/or passive components (e.g., voltage step-down controllers, voltage converters, rectifiers, filters, etc.) to regulate or control the power received through the battery pack interface 310 and to the wireless communication controller 330 and controller 300. When the battery pack 235 is not coupled to the power tool 105, the wireless communication controller 330 may be configured to receive power from a back-up power source 375 (e.g., a coin cell battery).

Furthermore, the controller 300 is configured to control operation of the motor 240. FIG. 4 illustrates a circuit diagram of a motor driving circuit 400 included in power tool 105. As shown, the motor driving circuit 400 includes the battery pack 235, the motor 240, and the switching module 325. The switching module 325 includes a number of high side power switching devices (e.g., FETs) 405 and a number of low side power switching devices (e.g., FETs) 410.

During normal operation of power tool 105 (e.g., during a fastening operation), the controller 300 provides control signals to control the high side FETs 405 and the low side FETs 410 to drive the motor 240 based on motor feedback information and user controls. For example, when a user of the power tool 105 pulls or activates the trigger 225, the controller 300 detects activation of the trigger switch 320 and applies control signals to the switching module 325. The control signals applied by the controller 300 selectively enable and disable the FETs 405 and 410 (e.g., sequentially, in pairs). The selective control of the FETs 405 and 410 results in power from the battery pack 235 being selectively applied to stator coils 415 of the motor 240, thereby causing rotation of a rotor 420 relative to a stator 425. In some embodiments, the control signals include pulse width modulated (PWM) signals having a duty cycle that is set in proportion to or based on the amount of trigger pull of the trigger 225, to thereby control the speed or torque of the motor 240.

The controller 300 is further configured to control the motor 240 to emit a sound without causing a rotation of the motor 240. In particular, the controller 300 is configured to control the switching module 325 to apply high frequency current signals within the audible frequency range (e.g., 20 Hz-20 kHz) to the stator coils 415. That is, the controller 300 controls the switching module 325 to apply current signals having a high frequency, such as a frequency greater than 10 kHz, within the audible frequency range. When the stator coils 415 of motor 240 are excited by the high frequency current signals, the rotor 420 does not rotate relative to the stator 425. Rather, under high frequency excitation, the motor 240 emits a sound signal in the audible frequency range (e.g., 20 Hz-20 kHz).

To cause rotation of the rotor 420 relative to the stator 425, the frequency of the current applied to the stator coils 415 needs to be synchronized with the rotor 420. When the frequency of the current, or the excitation frequency, applied to the stator coils 415 is too high at startup of the motor 240, synchronization between the applied current and the rotor 420 does not occur. Accordingly, the rotor 420 does not rotate relative the stator 425 when the excitation frequency is too high. Rather, when the motor 240 is under a high frequency excitation, the motor 240 experiences a time varying force that causes the structure of the motor 240 to vibrate and generate a sound. That is, the motor 240 vibrates and emits a sound at the excitation frequency without any movement of the rotor 420 when the excitation frequency is too high. Therefore, the controller 300 is operable to control the motor 240 to emit a sound without rotating the rotor 420 by applying a high frequency current signal within the audible frequency range to the stator coils 245 at startup of the motor 240.

Accordingly, the controller 300 is configured to operate the motor 240 as a speaker by applying high frequency current signals to the stator coils 415. In some embodiments, the sound signal emitted by the motor 240 is a random signal within the audible frequency range for human beings. In some embodiments, the controller 300 controls the switching of the FETs 405 and 410 such that motor 240 emits a particular sound signal (e.g., a song or other tune). In some embodiments, the controller 300 controls the switching of the FETs 405 and 410 such that motor 240 emits sound in a particular pattern. For example, the controller 300 may be configured to control the motor 240 to periodically emit a sound. In some embodiments, the controller 300 controls the motor 240 to emit a sound based on an input form the user of power tool 105. For example, the controller 300 may be configured to control the motor 240 to emit a sound when a user pulls or activates the trigger 225 for a predetermined amount of time. In some embodiments, the controller 300 is configured to control the motor 240 to emit a sound in response to wireless communication controller 330 receiving a signal from the external device 110. For example, when a user of the external device 110 wants to locate the power tool 105, the user may transmit, by the external device 110, a signal that instructs the motor 240 to emit a sound.

Figure 5:
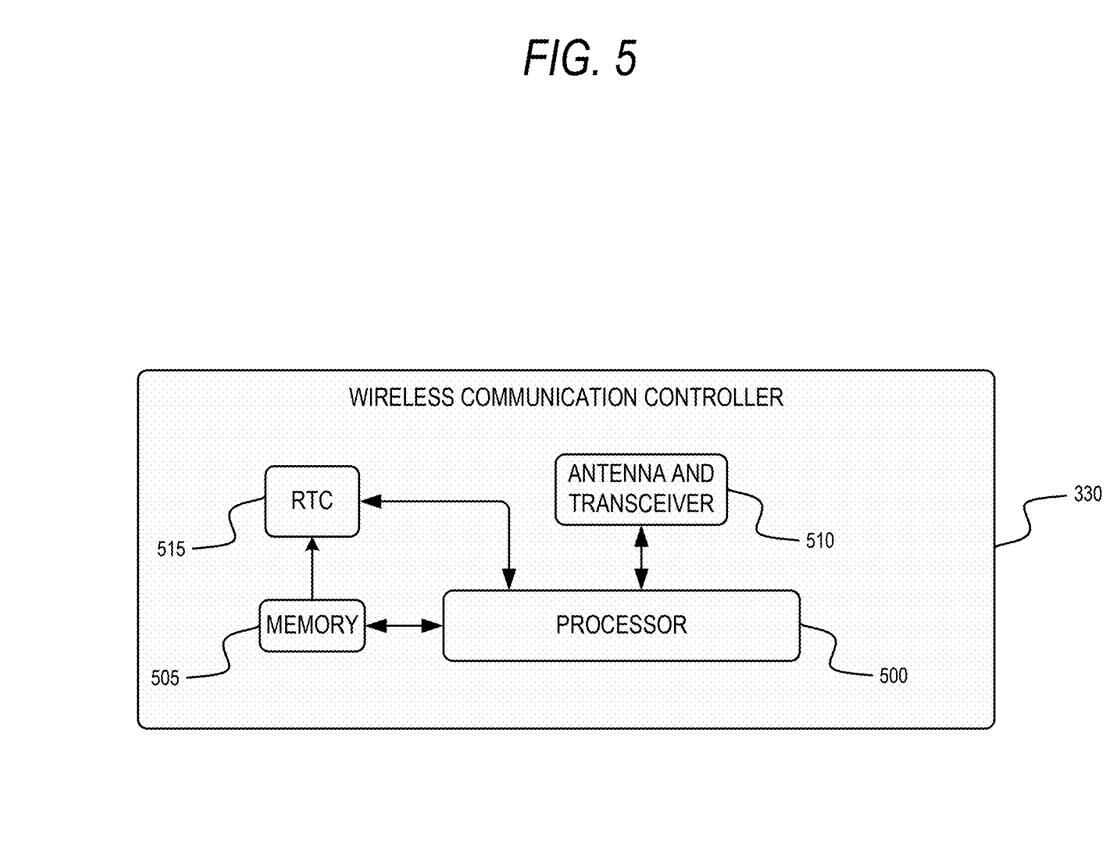
FIG. 5 illustrates a block diagram of a wireless communication controller included in the power tool of FIG. 2, according to embodiments described herein.

FIG. 5 is a generalized schematic of the wireless communication controller 330 connected to the controller 300 of power tool 105. As shown, the wireless communication controller 330 includes a processor 500, a memory 505, a radio antenna and transceiver 510, and a real-time clock (RTC) 515. The wireless communication controller 330 enables the power tool 105 to communicate with the external device 110. The radio antenna and transceiver 510 operate together to send and receive wireless messages to and from the external device 110 and the processor 500. The memory 505 can store instructions to be implemented by the processor 500 and/or may store data related to communications between the power tool 105 and the external device 110, or the like. The processor 500 for the wireless communication controller 330 controls wireless communications between the power tool 105 and the external device 110. For example, the processor 500 associated with the wireless communication controller 330 buffers incoming and/or outgoing data, communicates with the controller 300, and determines the communication protocol and/or settings to use in wireless communications.

In the illustrated embodiment, the wireless communication controller 330 is a Bluetooth® controller. The Bluetooth® controller communicates with the external device 110 employing the Bluetooth® protocol. Therefore, in the illustrated embodiment, when the external device 110 and the power tool 105 are within a communication range (i.e., in proximity) of each other, they are capable of exchanging data. In other embodiments, the wireless communication controller 330 communicates using other protocols (e.g., Wi-Fi, ZigBee, a proprietary protocol, etc.) over different types of wireless networks. For example, the wireless communication controller 330 may be configured to communicate via Wi-Fi through a wide area network such as the Internet or a local area network, or to communicate through a piconet (e.g., using infrared or NFC communications).

In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, 5G New Radio, a Digital Enhanced Cordless Telecommunications ("DECT") network, a Digital AMPS ("IS-136/TDMA") network, or an Integrated Digital Enhanced Network ("iDEN") network, etc.

The wireless communication controller 330 is configured to receive data from the controller 300 and relay the information to the external device 110 via the antenna and transceiver 510. In a similar manner, the wireless communication controller 330 is configured to receive information (e.g., commands, configuration and programming information, etc.) from the external device 110 via the antenna and transceiver 510 and relay the information to the controller 300.

The RTC 515 can increment and keep time independently of the other power tool 105 components. The RTC 515 can receive power from the battery pack 235 when the battery pack 235 is connected to the power tool 105 and can receive power from the back-up power source 375 when the battery pack 235 is not connected to the power tool 105. Having the RTC 515 as an independently powered clock enables time stamping of operational data (stored in memory 505 for later export) and a security feature whereby a lockout time is set by a user (e.g., via the external device 110) and the tool is locked-out when the time of the RTC 515 exceeds the set lockout time.

The external device 110 included in communication system 100 is illustrated as a smartphone. However, it should be understood that the external device 110 may be implemented as any electronic device that is capable of communicating wirelessly with the power tool 105 and providing a user interface. For example, in some embodiments, the external device is implemented as a laptop computer, a tablet computer, a personal digital assistant (PDA), or another electronic device capable of communicating wirelessly with the power tool 105 and providing a user interface.

Figure 6:
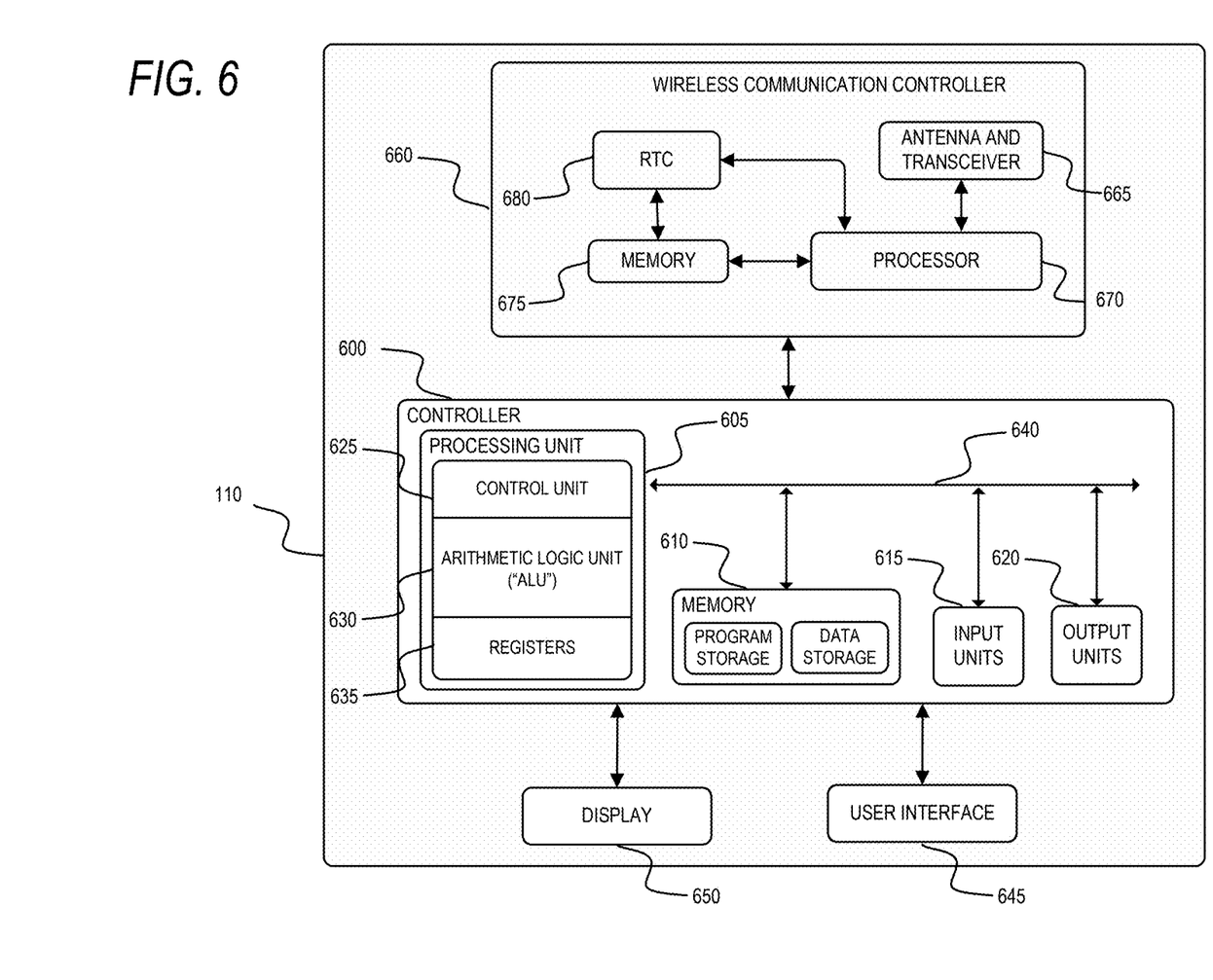
FIG. 6 illustrates a block diagram of an external device included in the communication system of FIG. 1, according to embodiments described herein.

FIG. 6 illustrates a generalized schematic of the external device 110. The external device 110 includes a controller 600 that includes a plurality of electrical and electronic components that provide power, operational control, and protection to the components and modules within the controller 600 and/or external device 110. For example, the controller 600 includes, among other things, a processing unit, or processor, 605 (e.g., a microprocessor, an electronic processor, an electronic controller, a microcontroller, or another suitable programmable device), a memory 610, input units 615, and output units 620. The processing unit 605 includes, among other things, a control unit 625, an arithmetic logic unit ("ALU") 630, and a plurality of registers 635 (shown as a group of registers in FIG. 6), and is implemented using a known computer architecture (e.g., a modified Harvard architecture, a von Neumann architecture, etc.). The processing unit 605, the memory 610, the input units 615, and the output units 620, as well as the various modules connected to the controller 600 are connected by one or more control and/or data buses (e.g., common bus 640). The control and/or data buses are shown generally in FIG. 6 for illustrative purposes. The use of one or more control and/or data buses for the interconnection between and communication among the various modules and components would be known to a person skilled in the art in view of the embodiments described herein.

The memory 610 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 605 is connected to the memory 610 and executes software instructions that are capable of being stored in a RAM of the memory 610 (e.g., during execution), a ROM of the memory 610 (e.g., on a generally permanent basis), or another non-transitory computer readable medium such as another memory or a disc. Software included in the implementation of the external device 110 can be stored in the memory 610 of the controller 600. The software includes, for example, firmware, one or more applications, program data, filters, rules, one or more program modules, and other executable instructions. The controller 600 is configured to retrieve from the memory 610 and execute, among other things, instructions related to the control processes and methods described herein. In other embodiments, the controller 600 includes additional, fewer, or different components.

The controller 600 is electrically and/or communicatively connected to additional components of the external device 110, such as a user interface 645, a display 650, and a wireless communication controller 660. Although not illustrated, the user interface 645 includes one or more user input devices (e.g., buttons, dials, toggle switches, and a microphone for voice control) and user outputs (e.g., speakers and tactile feedback elements). The display 650 is configured to output visual data to a user. In some embodiments, the display 650 is implemented as a touch-screen display that is configured to both output visual data to a user and receiver user inputs.

The wireless communication controller 660 enables the external device 110 to communicate wirelessly with the wireless communication controller 660 of the power tool 105. Similar to the wireless communication controller 330 of the power tool 105, the wireless communication controller 660 of the external device 110 includes at least a radio antenna and transceiver 665 that operate together to send and receive wireless messages to and from the external device 110. The wireless communication controller 660 further includes a processor 670, a memory 675, and an RTC 680. The memory 675 can store instructions to be implemented by the processor 670 and/or may store data related to communications between the power tool 105 and the external device 110, or the like. The processor 670 for the wireless communication controller 660 controls wireless communications between the power tool 105 and the external device 110. For example, the processor 670 associated with the wireless communication controller 660 buffers incoming and/or outgoing data, communicates with the controller 600, and determines the communication protocol and/or settings to use in wireless communications.

In the illustrated embodiment, the wireless communication controller 660 is a Bluetooth® controller. The Bluetooth® controller communicates with the power tool 105 employing the Bluetooth® protocol. Therefore, in the illustrated embodiment, when the external device 110 and the power tool 105 are within a communication range (i.e., in proximity) of each other, they are capable of exchanging data. In other embodiments, the wireless communication controller 660 communicates using other protocols (e.g., Wi-Fi, ZigBee, a proprietary protocol, etc.) over different types of wireless networks. For example, the wireless communication controller 660 may be configured to communicate via Wi-Fi through a wide area network such as the Internet or a local area network, or to communicate through a piconet (e.g., using infrared or NFC communications).

In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, 5G New Radio, a Digital Enhanced Cordless Telecommunications ("DECT") network, a Digital AMPS ("IS-136/TDMA") network, or an Integrated Digital Enhanced Network ("iDEN") network, etc.

The wireless communication controller 660 is configured to receive data from the controller 600 and relay the information to the power tool 105 via the antenna and transceiver 665. That is, the controller 600 transmits signals to the power tool 105 using the wireless communication controller 660. For example, the controller 600 is configured to, by the wireless communication controller 660, transmit a signal to power tool 105 that causes the motor 240 to emit a sound. In a similar manner, the wireless communication controller 660 is configured to receive information (e.g., operating data, advertisement packets, etc.) from the power tool 105 via the antenna and transceiver 665 and relay the information to the controller 600.

Returning to the controller 600 of the external device 110, the processor 605 is configured to execute application software stored in memory 610 to generate a graphical user interface (GUI) on the display 650. A user of external device 110 is able to interact with the power tool 105 using the user interface 645 and the GUI generated on display 650. As described above, in some instances, the display 650 is a touch screen display, and thus, a user of the external device 110 is able to interact with the external device 110 using only the display 650. As will become apparent from the description below, at least in some embodiments, the app on the external device 110 provides a user with a single entry point for controlling, accessing, and/or interacting with the power tool 105. In embodiments in which communication system 100 includes a plurality of power tools 105, the app provides the user with the ability to control, access, and/or interact with each of the plurality of power tools 105.

Figure 7:
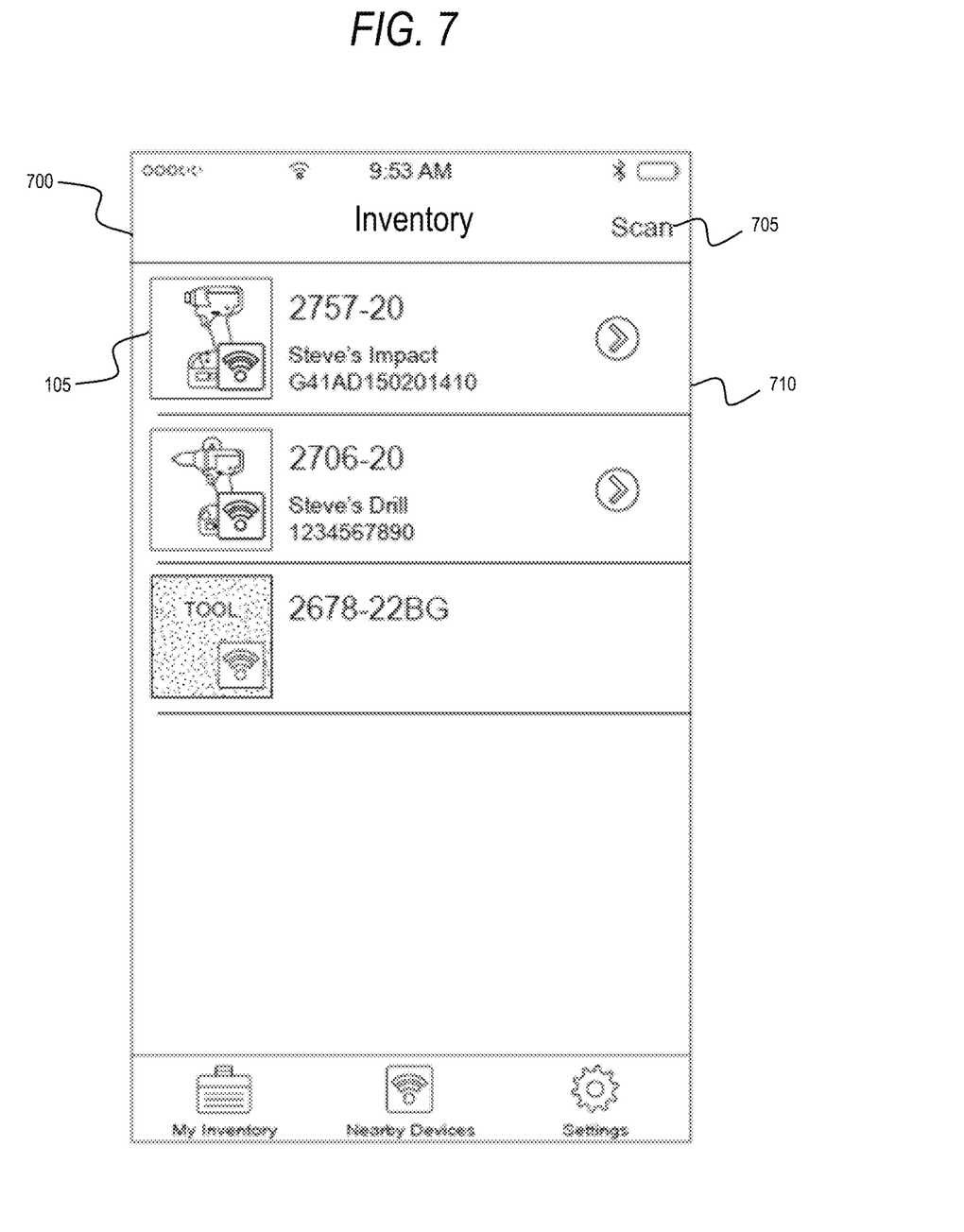
FIGS. 7, 8, and 9 illustrate exemplary interfaces of the external device for controlling the power tool, according to embodiments described herein.

FIG. 7 illustrates an example of a tool inventory screen 700 of the GUI generated on the display 650. The tool inventory screen 700 is used to identify and communicatively connect with power tools 105 that are within communication range of the external device 110. For instance, in response to a user selecting the "scan" input 705, the wireless communication controller 660 scans a radio wave communication spectrum used by the power tools 105 and identifies any power tools 105 within range that are advertising. The identified power tools 105 that are advertising are then listed on the tool inventory screen 700. As shown in FIG. 7, in response to a scan, three power tools 105, including the impact driver, that are advertising are listed in the tool inventory list 710.

From the tool inventory screen 700, a user can select a power tool from the tool inventory list 710 to which to communicatively connect. Each type of power tool 105 with which the external device 110 can communicate includes an associated tool graphical user interface (tool interface). When the external device 110 is communicatively connected to the selected power tool, the controller 600 displays a tool interface of the selected power tool 105 on the display 650.

Figure 8:
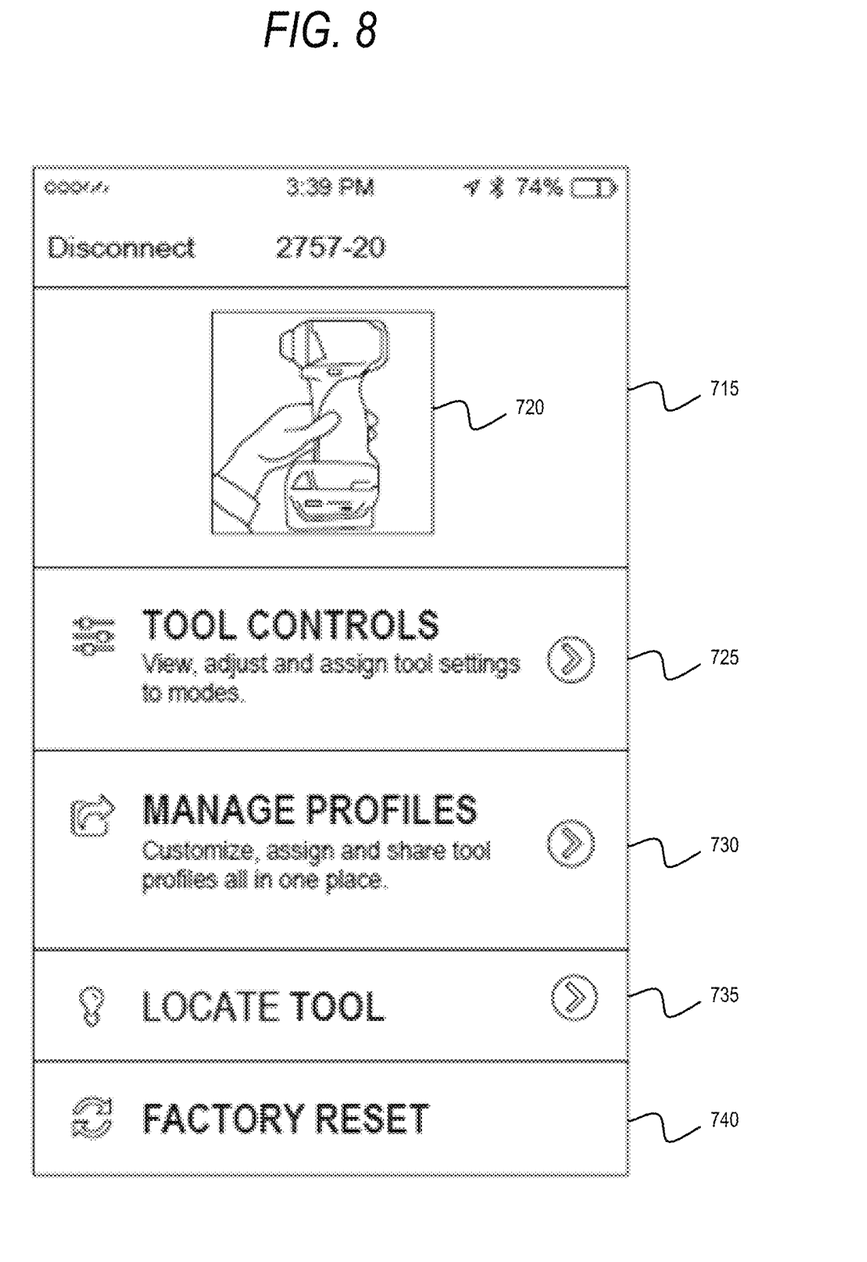

FIG. 8 illustrates an example tool interface screen 715 when the power tool 105 connected to external device 110 is an impact driver. The tool interface screen 715 includes an icon 720 for the communicatively connected power tool 105, which may be the same as the icon shown in the tool inventory list 710. The tool interface screen 715 includes a variety of selectable options for interacting with the connected power tool 105, such as tool controls option 725, manage profiles option 730, locate tool option 735, and factory reset option 740. The locate tool option 735 may be selected by a user that is trying to locate the power tool 105 that is communicatively connected to external device 110. For example, when the user of the external device 110 is on a jobsite that includes multiple power tools, the user may desire to cause the power tool 105 to provide a user-perceptible indication (e.g., emit a sound, flash a light, etc.) to assist the user with locating the power tool 105.

Figure 9:
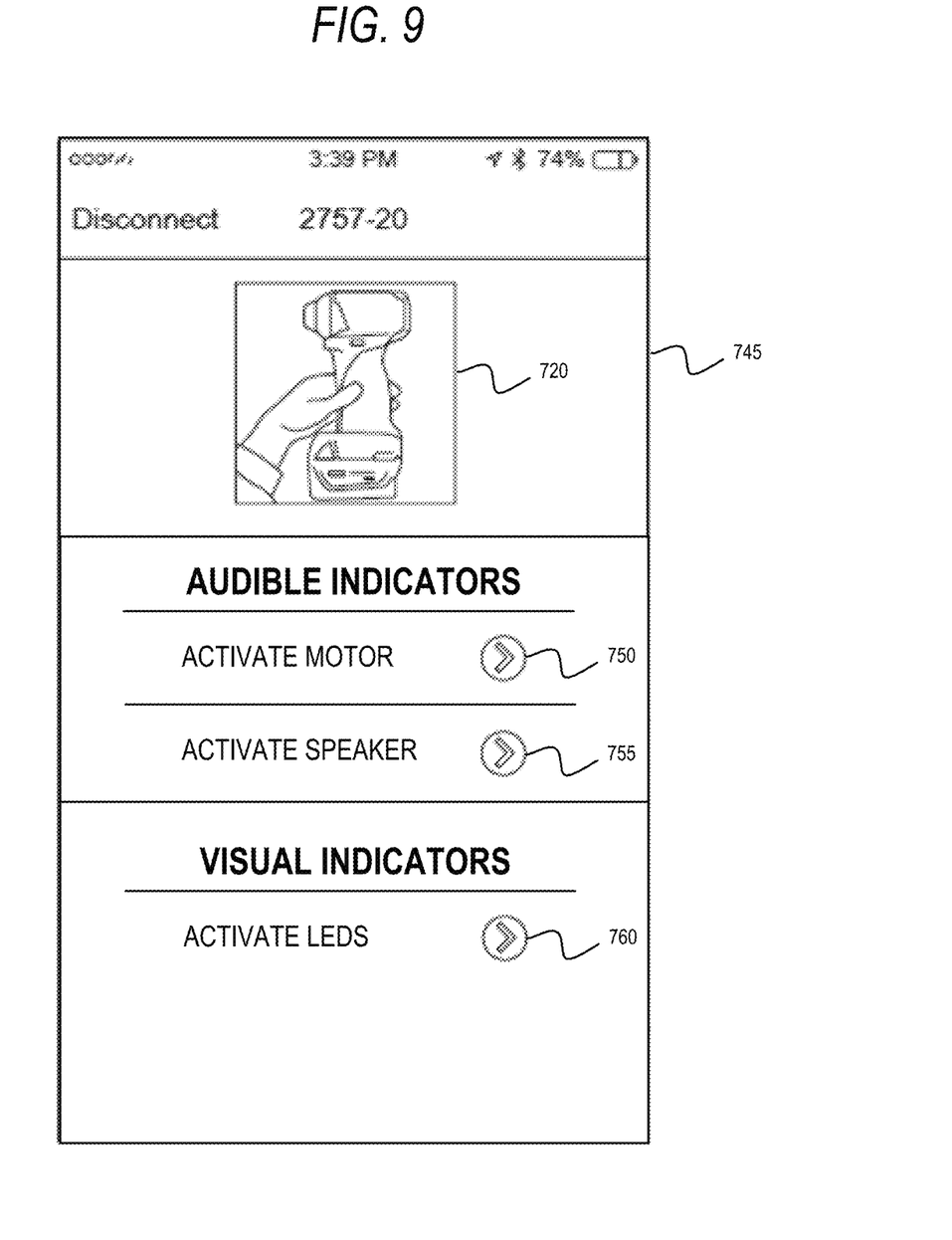

When the locate tool option 735 is selected, a locate tool screen 745 is displayed on display 650, as shown in FIG. 9. The locate tool screen 745 provides a user with multiple selectable options for commanding the connected power tool 105 to perform a user-perceptible indication to assist with locating the power tool 105. For example, the locate tool screen 745 provides a user with options such as an activate motor option 750, an activate speaker option 755, and an activate LED option 760. Selecting the activate motor option 750 causes the controller 600 of external device to transmit, by the wireless communication controller 660, a signal to power tool 105 that causes the motor 240 to emit a sound. In response to receiving, by the wireless communication controller 330, the activate motor command from external device 110, the controller 300 of power tool 105 is configured to control the switching module 325 to apply high frequency current signals to the stator coils 415 of motor 240. As described above, under high frequency excitation, the motor 240 does not rotate. However, the motor 240 emits a sound signal in the audible frequency range. Accordingly, a user of the external device 110 is able to remotely control the motor 240 of power tool 105 to emit a sound signal when the user is attempting to locate the power tool 105.

In some embodiments, the controller 300 is configured to control the motor 240 to emit a sound for a configured amount of time (e.g., 5 seconds, 1 minute, etc.). In some embodiments, the controller 300 is configured to control the motor 240 to emit a sound until a user of the external device 110 transmits a second command that causes the controller 300 to stop controlling the motor 240 to emit a sound. For example, upon finding the power tool 105 when the motor 240 emits a sound, a user of the external device 110 may select an option that causes external device 110 to transmit a signal that commands the controller 300 to turn off the motor 240. In some embodiments, the controller 300 is configured to control the motor 240 to emit a sound until a user of the power tool 105 pulls or activates the trigger 225. In some embodiments, the controller 300 is configured to control the motor 240 to emit a sound until a configurable amount of time passes or expires.

Similarly, selecting the activate speaker option 755 causes the external device 110 to transmit, by the wireless communication controller 660, a signal to power tool 105 that causes a speaker included in the power tool 105 to emit a sound. In response to receiving, by the wireless communication controller 330, the activate speaker command from external device 110, the controller 300 of power tool 105 controls a speaker included in power tool 105 to emit a sound. Likewise, selecting the activate LED option 760 causes the external device 110 to transmit, by the wireless communication controller 660, a signal to power tool 105 that causes one or more of the LED indicators (e.g., indicators 230, a worklight, etc.) included in the power tool 105 to be illuminated. In response to receiving, by the wireless communication controller 330, the activate LED command from external device 110, the controller 300 of power tool 105 controls the LED indicator(s) 230 included in power tool 105 to turn on. In some embodiments, the controller 300 flashes the LED indicator(s) 230. In other embodiments, the controller 300 illuminates the LED indicator(s) 230 without flashing them. In some embodiments, the controller 300 is configured to activate the speaker and/or illuminate the LED indicator(s) 230 for a configurable amount of time. In some embodiments, the controller 300 is configured to activate the speaker and/or illuminate the LED indicator(s) 230 until a signal that causes the controller 300 to turn off the speaker and/or LED indicators(s) 230 is received from the external device 110. In some embodiments, the controller 300 is configured to activate the speaker and/or illuminate the LED indicator(s) 230 until a user operates the trigger 225 of the power tool 105.

In some embodiments, a user of the external device 110 is able to command the power tool 105 to provide one or more audible and visual indications simultaneously. For example, the user of external device 110 is able to select the activate motor option 750 and one or more of the activate speaker option 755 and the activate LED option 760. When a user of external device 110 selects both the activate motor option 750 and the activate LED option 760, the wireless communication controller 660 transmits one or more signals to power tool 105 that cause the motor 240 to emit a sound and the LED indicator(s) to be illuminated simultaneously. Accordingly, in response to receiving, by the wireless communication controller 330, the signal from the external device 110, the controller 300 is configured to control the motor 240 to emit a sound and illuminate one or more of the LED indicator(s) 230 simultaneously.

Figure 10:
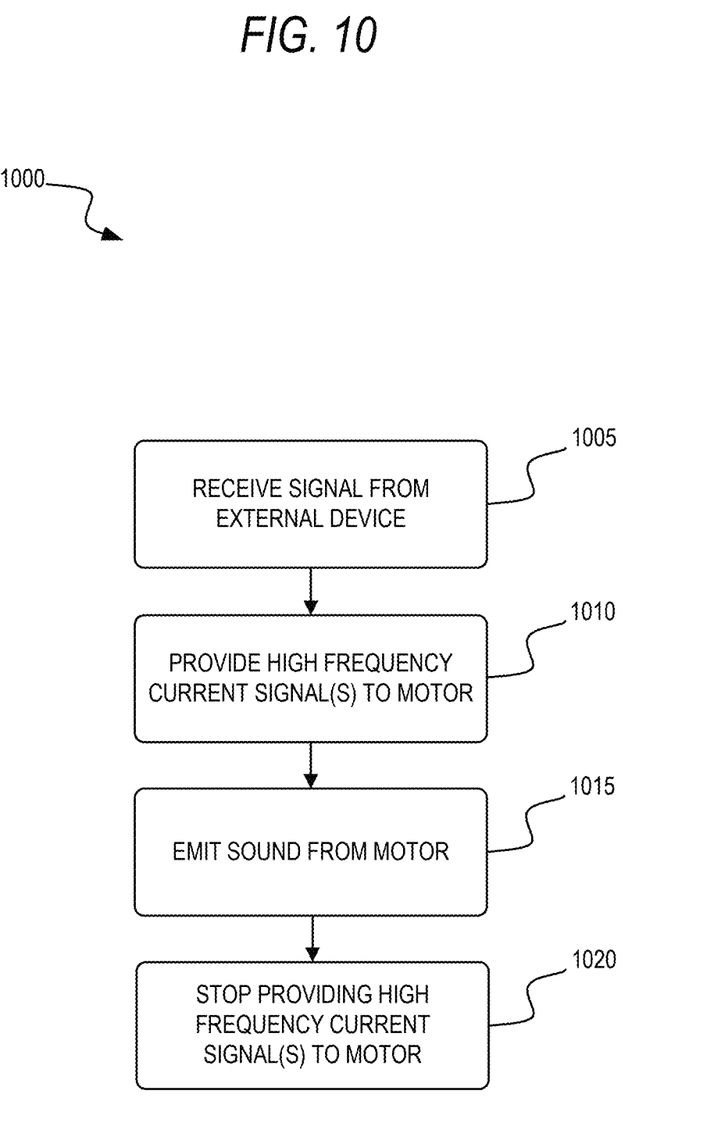
FIG. 10 illustrates a process for locating a power tool, according to embodiments described herein.

FIG. 10 illustrates a process 1000 executed by the controller 300 for locating the power tool 105. Process 1000 begins when the controller 300 receives, by the wireless communication controller 330, a signal from the external device 110 that commands the motor 240 to emit a sound (STEP 1005).

In response to receiving the signal from the external device 110, controller 300 is configured to supply one or more high frequency current signals to the stator coils 415 of motor 240 (STEP 1010). As described above, the controller 300 is configured to control the switching module 325 to selectively supply high frequency current from the battery pack 235 to the motor 240. When stator coils 415 are excited with high frequency current signals, the motor 240 emits a sound signal (STEP 1015). In particular, the motor 240 emits a sound signal without rotating the rotor 420 relative to the stator 425. After the motor 240 emits the sound, the controller 300 is configured to control the switching module 325 to stop providing high frequency current signals to the stator coils 415 (STEP 1020).

Thus, embodiments described herein provide, among other things, systems and methods for emitting sound from a power tool motor without rotating the motor. Various features and advantages are set forth in the following claims.

What is claimed is:

1. A power tool comprising:
   a battery pack interface configured to receive a removable and rechargeable battery pack;
   a motor including a rotor and a stator, the rotor operable to rotate relative to the stator;
   a switching module that includes a plurality of switching devices connected between the battery pack interface and the motor; and
   a controller including a processor and a memory, the controller configured to:
      receive a signal from an external device,
      control the switching module to provide a high frequency current signal from the battery pack interface to the motor in response to receiving the signal, the motor configured to emit an audible sound in response to the high frequency current signal, and
      control the switching module to stop providing the high frequency current signal to the motor.

2. The power tool of claim 1, wherein the rotor does not rotate relative to the stator when the high frequency current signal is provided to the motor.

3. The power tool of claim 1, wherein the controller wirelessly receives the signal by a wireless communication controller connected to the power tool.

4. The power tool of claim 1, wherein the controller is further configured to illuminate a light emitting diode (LED) included in the power tool in response to receiving the signal.

5. The power tool of claim 1, wherein the controller is further configured to activate a speaker included in the power tool in response to receiving the signal.

6. The power tool of claim 1, wherein the controller is further configured to control the switching module to stop providing the high frequency current signal to the motor in response to receiving a second signal from the external device.

7. The power tool of claim 1, wherein the controller is further configured to control the switching module to stop providing the high frequency current signal to the motor in response to a user activating a trigger of the power tool.

8. The power tool of claim 1, wherein the controller is further configured to control the switching module to stop providing the high frequency current signal to the motor after an amount of time passes.

9. The power tool of claim 1, wherein a frequency of the high frequency current signal is 20 kilohertz or less (kHz).

10. A method of locating a power tool, the power tool including a battery pack interface for receiving a removable and rechargeable battery pack, a motor that includes a stator and a rotor operable to rotate relative to the stator, a switching module that includes a plurality of switching devices connected between the battery pack interface and the motor, and a controller including a processor and a memory, the method comprising:
- receiving, by the controller, a signal from an external device;
- controlling, by the controller, the switching module to provide a high frequency current signal from the battery pack to the motor in response to receiving the signal;
- emitting, by the motor, an audible sound in response to the high frequency current signal; and
- controlling, by the controller, the switching module to stop providing the high frequency current signal to the motor.

11. The method of claim 10, wherein the rotor does not rotate relative to the stator when the high frequency current signal is provided to the motor.

12. The method of claim 10, wherein receiving the signal from the external device includes wirelessly receiving, by a wireless communication controller of the power tool, the signal.

13. The method of claim 10, further comprising illuminating, by the controller, a light emitting diode (LED) included in the power tool in response to receiving the signal.

14. The method of claim 10, further comprising activating, by the controller, a speaker included in the power tool in response to receiving the signal.

15. The method of claim 10, further comprising:
- receiving, by the controller, a second signal from the external device; and
- controlling, by the controller, the switching module to stop providing the high frequency current signal to the motor in response to receiving the second signal.

16. The method of claim 10, further comprising controlling, by the controller, the switching module to stop providing the high frequency current signal to the motor in response to a user activating a trigger of the power tool.

17. The method of claim 10, further comprising controlling, by the controller, the switching module to stop providing the high frequency current signal to the motor after an amount of time passes.

18. The method of claim 10, wherein a frequency of the high frequency current signal is 20 kilohertz or less (kHz).

19. A communication system comprising:
- an external device including a first wireless communication controller configured to transmit a signal; and
- a power tool including:
  - a battery pack interface configured to receive a removable and rechargeable battery pack,
  - a motor including a rotor and a stator, the rotor operable to rotate relative to the stator,
  - a switching module that includes a plurality of switching devices connected between the battery pack interface and the motor,
  - a second wireless communication controller configured to wirelessly receive the signal transmitted by the external device; and
  - a controller including a processor and a memory, the controller configured to control the switching module to provide a high frequency current signal from the battery pack interface to the motor in response to the second wireless communication controller receiving the signal, the motor configured to emit an audible sound in response to the high frequency current signal.

20. The communication system of claim 19, wherein the rotor does not rotate relative to the stator when the motor is provided with the high frequency current signal.

* * * * *